US009982802B1

(12) United States Patent
Patterson

(10) Patent No.: US 9,982,802 B1
(45) Date of Patent: May 29, 2018

(54) CONDUIT SUPPORT BRACKET SYSTEM

(71) Applicant: Jeremy Patterson, Fairhope, AL (US)

(72) Inventor: Jeremy Patterson, Fairhope, AL (US)

(*) Notice: Subject to any disclaimer, the term of this patent is extended or adjusted under 35 U.S.C. 154(b) by 0 days. days.

(21) Appl. No.: 15/591,050

(22) Filed: May 9, 2017

(51) Int. Cl.
*F16L 3/08* (2006.01)
*F16L 3/20* (2006.01)
*F16L 3/127* (2006.01)
*F16L 3/12* (2006.01)

(52) U.S. Cl.
CPC .............. *F16L 3/20* (2013.01); *F16L 3/127* (2013.01); *F16L 3/1218* (2013.01)

(58) Field of Classification Search
USPC ........................................................ 248/67
See application file for complete search history.

(56) References Cited

U.S. PATENT DOCUMENTS

| | | | | |
|---|---|---|---|---|
| 1,600,835 A | * | 9/1926 | Manley | B25H 1/0007 248/172 |
| 3,028,135 A | * | 4/1962 | Funderburg, Jr. | F24F 13/32 248/237 |
| 3,711,053 A | | 1/1973 | Drake | |
| 3,809,348 A | | 5/1974 | Dilaura | |
| 4,056,903 A | | 11/1977 | Guarnere | |
| 4,658,521 A | * | 4/1987 | Thorpe | D06C 3/08 248/188.9 |
| 5,067,685 A | * | 11/1991 | Johnston, Jr. | H02G 3/10 248/237 |
| 5,163,642 A | * | 11/1992 | Torrens | F16L 3/00 248/49 |
| 5,221,069 A | | 6/1993 | Struthers | |
| 5,232,204 A | * | 8/1993 | Nunez | E04G 25/06 254/133 A |
| 5,820,092 A | | 10/1998 | Thaler | |
| 5,931,423 A | | 8/1999 | Heideloff | |
| 5,971,329 A | | 10/1999 | Hickey | |
| 6,062,515 A | | 5/2000 | Snyder | |
| 6,076,778 A | | 6/2000 | Brown | |
| 6,206,613 B1 | * | 3/2001 | Elkins | F16L 3/02 405/157 |
| 6,324,800 B1 | * | 12/2001 | Valentz | E04D 13/12 248/346.01 |
| 6,402,096 B1 | | 6/2002 | Ismert | |
| 6,543,731 B1 | | 4/2003 | Mercier | |
| 6,592,093 B2 | | 7/2003 | Valentz | |
| 6,612,529 B2 | | 9/2003 | Snyder | |
| 7,039,965 B1 | | 5/2006 | Ismert | |
| 7,040,586 B2 | | 5/2006 | Kusber | |
| 7,223,052 B1 | | 5/2007 | Evans | |

(Continued)

*Primary Examiner* — Monica Millner
(74) *Attorney, Agent, or Firm* — AdamsIP, LLC; Stephen Thompson; Gary N. Stewart

(57) ABSTRACT

A conduit support bracket is provided. The support bracket has an elongated base that can be secured to a pair of adjacent joists having a space between the joists. The support bracket has a vertical support arm secured to the base at one end of the arm. The length of the support arm is adjustable. A support platform is secured to the opposite end of the support arm. The support platform can be rotated both horizontally and vertically to adjust the orientation of the support platform. As many support brackets as needed may be used at intervals to support a length of conduit in an elevated position above joists.

20 Claims, 9 Drawing Sheets

(56) References Cited

U.S. PATENT DOCUMENTS

| | | | |
|---|---|---|---|
| 7,506,593 B2 * | 3/2009 | Strabel, III | F16M 5/00 |
| | | | 108/156 |
| 7,540,452 B2 | 6/2009 | Caminita | |
| 7,575,213 B2 | 8/2009 | Rausch | |
| 7,926,766 B2 | 4/2011 | Tjerrild | |
| 7,931,242 B2 | 4/2011 | Tjerrild | |
| 7,942,371 B1 | 5/2011 | McCoy | |
| 7,954,287 B2 * | 6/2011 | Bravo | E04F 15/0247 |
| | | | 174/135 |
| 8,210,488 B2 | 7/2012 | Small | |
| 8,517,326 B2 | 8/2013 | Kelley | |
| 8,794,580 B1 | 8/2014 | Koehler | |
| 8,827,232 B2 | 9/2014 | Crowley | |
| 9,052,120 B2 | 6/2015 | Villar | |
| 9,168,982 B1 * | 10/2015 | Robichaux, Jr. | B63B 25/002 |
| 9,200,729 B2 | 12/2015 | Hobbs | |
| 9,206,927 B2 | 12/2015 | Carter | |
| 9,226,575 B2 * | 1/2016 | Crowley | F24F 13/32 |
| 9,228,756 B2 | 1/2016 | Crowley | |
| 9,534,709 B2 | 1/2017 | Wilson | |
| 9,559,504 B2 | 1/2017 | Jones | |
| 2002/0148940 A1 * | 10/2002 | Lee | B60N 3/16 |
| | | | 248/352 |
| 2003/0137847 A1 | 7/2003 | Cooper | |
| 2006/0186284 A1 * | 8/2006 | Root | F16B 7/1472 |
| | | | 248/161 |

\* cited by examiner

CONDUIT SUPPORT BRACKET SYSTEM

FIELD OF THE INVENTION

The present invention relates generally to a system of support brackets for supporting conduit such as air ducts.

BACKGROUND

When constructing buildings such as residential homes or commercial properties, conduit such as air ducts are typically installed in an enclosed space above the ceiling of the building or home. Conduit installation typically occurs during construction of the frame of the structure before sheetrock or insulation have been installed. The conduit generally runs above a series of parallel joists that support the ceiling of the structure. Due to building codes that may require a specified amount of space above the ceiling for insulation, conduits such as air ducts are typically installed two to three feet above ceiling joists. In order to support air ducts in an elevated position above the joists, builders typically construct supporting wooden structures on an ad hoc basis for each construction job. This additional construction step is time consuming and inefficient and thus adds to the overall construction cost.

Accordingly, a need exists in the art for a conduit support bracket system that provides quick, simple installation of support structures for supporting conduit such as air ducts in an elevated position above ceiling joists.

SUMMARY

In accordance with the present invention, a conduit support bracket system is provided. The system comprises a plurality of individual support brackets that may be used in combination to support a length of conduit such as an air duct. Each support bracket comprises an elongated base, a vertical support arm secured to the base, and a support platform secured to the support arm. The base is configured to secure the base to a pair of adjacent and generally parallel joists having a space between the joists, which typically ranges from 16 inches to two feet. The base of the support bracket spans the space between the joists and may be bolted, screwed, or otherwise fastened to each of the joists in order to secure the base to the two adjacent joists. The support arm extends upwardly from the base in a direction generally perpendicular to the base. The length of the support arm is adjustable such that the height of the support platform may be adjusted.

The support platform preferably has an elongated shape and has an upper surface on which conduit may be supported. In a preferred embodiment, the support platform is configured to rotate in a horizontal direction. Thus, the elongated support platform may be set in a position generally parallel to the elongated base or may be rotated so that the platform and base are at any desired angle up to a 90-degree angle. In a preferred embodiment, the support platform is also configured to rotate in a vertical direction. Thus, the support platform may be rotated such that the upper surface of the support platform remains in the horizontal plane to ensure a level surface for supporting conduit even if the base is not level. The support bracket has locking mechanisms, which are preferably locking clamps, that lock the support platform in a fixed position after the height and the orientation of the support platform have been adjusted as necessary by the user.

The support brackets of the present bracket support system allow quick and easy installation of conduit during construction without the need for ad hoc construction of supporting structures for elevating conduit above ceiling joists. Because the orientation and general positioning of the support platform of each support bracket may be adjusted, the present system provides versatility in installing conduit in any desired configuration during the construction of any residential or commercial structure.

Accordingly, one object of the present invention is to provide a support bracket system suitable for supporting a length of conduit such as an air duct in an elevated position above ceiling joists.

DESCRIPTION OF THE DRAWINGS

These and other features, aspects, and advantages of the present invention will become better understood with regard to the following description, appended claims, and accompanying drawings where:

DETAILED DESCRIPTION

In the Summary above and in this Detailed Description, and the claims below, and in the accompanying drawings, reference is made to particular features, including method steps, of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with/or in the context of other particular aspects of the embodiments of the invention, and in the invention generally.

The term "comprises" and grammatical equivalents thereof are used herein to mean that other components, ingredients, steps, etc. are optionally present. For example, an article "comprising" components A, B, and C can contain only components A, B, and C, or can contain not only components A, B, and C, but also one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

Figure 1:
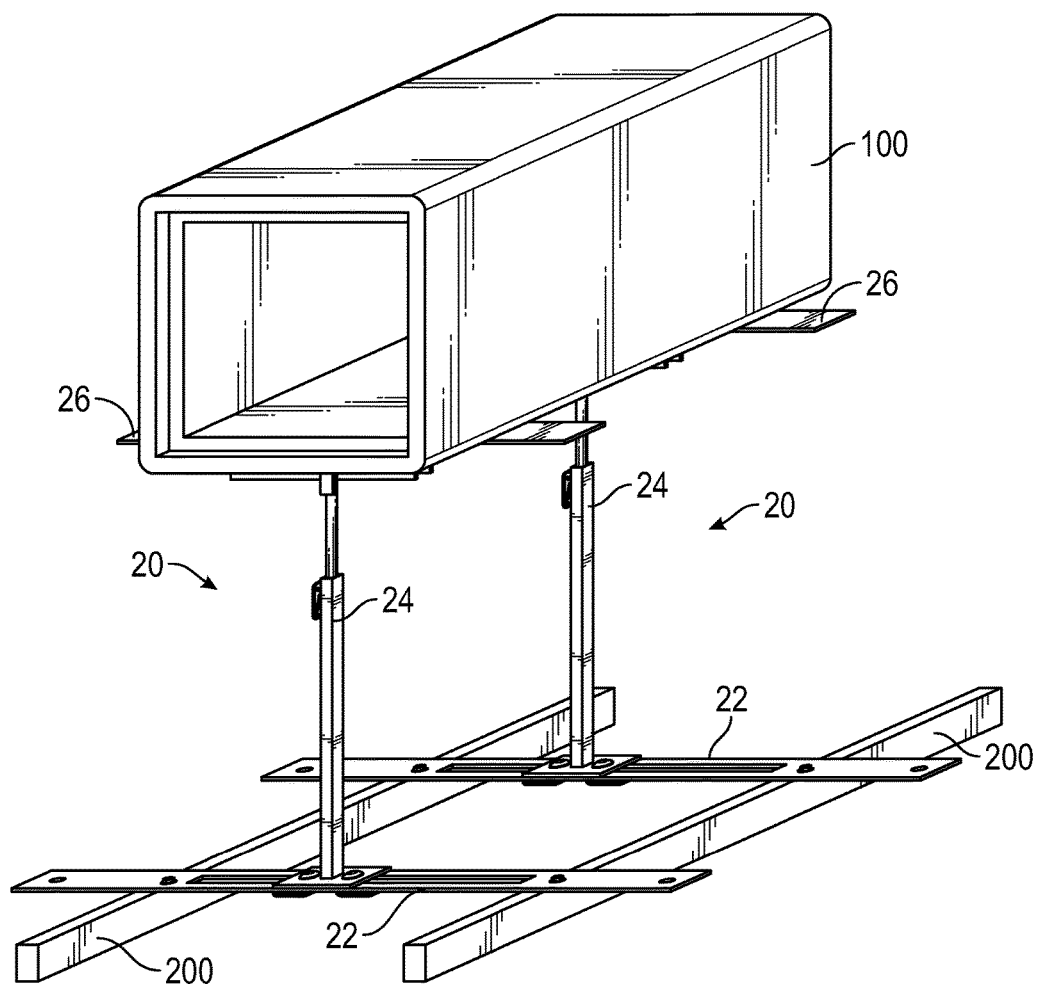
FIG. 1 shows a perspective view of support brackets supporting an air duct in accordance with the present disclosure.
Figure 2:
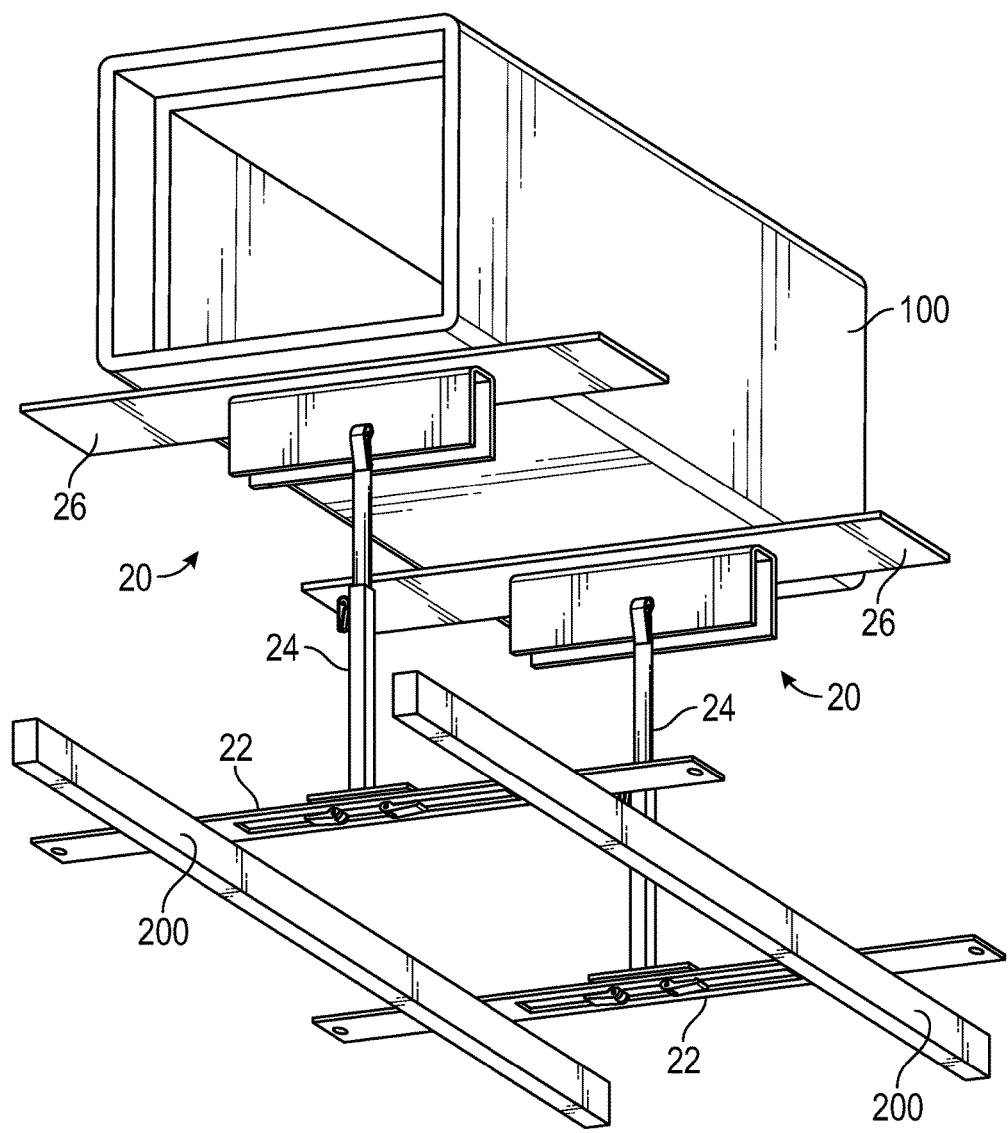
FIG. 2 shows a perspective view of support brackets supporting an air duct in accordance with the present disclosure.
Figure 3:
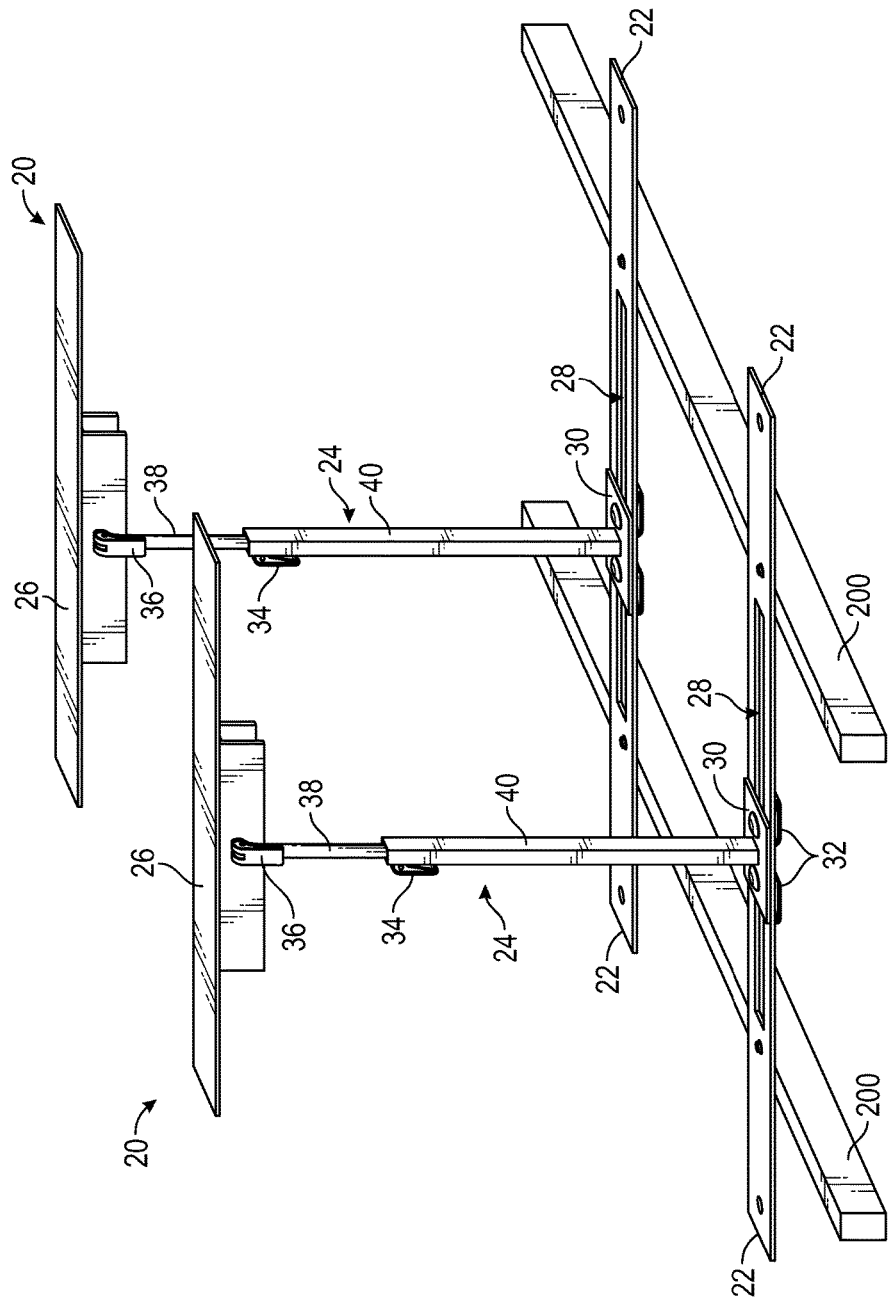
FIG. 3 shows a perspective view of two support brackets installed on a pair of joists in accordance with the present disclosure.

In accordance with the present invention, a conduit support bracket system is provided. The system comprises a plurality of individual support brackets that may be used in combination to support a length of conduit, such as an air duct, piping, or similar type of conduit. FIGS. 1 and 2 illustrate two support brackets 20 supporting an air duct 100 in an elevated position above a pair of adjacent, generally parallel wooden joists 200. FIG. 3 illustrates two support brackets 20 without the air duct for ease of illustrating the brackets.

Each support bracket 20 comprises an elongated base 22, a support arm 24, and a support platform 26. The elongated base 22 is configured to secure the base 22 to joists 200 that have a space between the joists. Joists typically have a spacing of at least one foot. In many structures, joists have a standard spacing, which is typically 16 inches or two feet of spacing between adjacent joists. The elongated base 22 spans the space between the joists 200 and may be bolted, screwed, or otherwise fastened to each of the joists 200 in order to secure the base 22 to the joists 200. The base 22 preferably has holes extending therethrough for fastening the base 22 to joists 200 using screws or bolts. In a preferred embodiment, the base 22 has a set of holes that are 16 inches apart and another set of holes that are two feet apart. As shown in FIGS. 1-3, the base 22 is fastened to adjacent joists 200 that are 16 inches apart by a pair of lag bolts screwed into an inner set of holes that are 16 inches apart. The outer set of holes of the base 22 shown in FIGS. 1-3 are preferably two feet apart. To secure the base 22 to joists having different spacing, the inner hole on one side of the base may be utilized in combination with an outer hole on the opposite side of the base. Additional holes may also be drilled through the base 22 if existing holes are not spaced appropriately.

The support bracket 20 may further comprise at least one fastener adapted for use with the base 22 for securing the base 22 to joists 200. In a preferred embodiment, the fastener may be a lag bolt, as shown in FIGS. 1-3, a screw, or any other fastener suitable for securing the base 22 to wooden joists 200 or to joists made of other materials, which may have pre-drilled holes. In other embodiments, the fastener may comprise at least one U-bolt sized to fit around a joist for securing the base to the joist.

As shown in FIG. 3, the support arm 24 has a first end secured to the base 22, and the support platform 26 is secured to a second end of the support arm 24. The support arm 24 extends upwardly from the base 22 in a direction generally perpendicular to the base. The support arm 24 is in a generally vertical position when the support bracket 20 is in an upright position, as shown in FIG. 3.

The length of the support arm 24 is adjustable such that the height of the support platform 26 may be adjusted. In one embodiment, as shown in FIGS. 1-5, the support arm 24 comprises an extension rod 38 slidably disposed within a tube 40 such that the support arm 24 is extendable by sliding the extension rod 38 out of the tube 40 and collapsible by sliding the extension rod 38 into the tube 40. In this embodiment, the tube 40 is secured to the base 22 and extends upwardly from the base 22 in a direction generally perpendicular to the base, and the support platform 26 is secured to one end of the extension rod 38 that is disposed outside of the tube 40.

Figure 4:
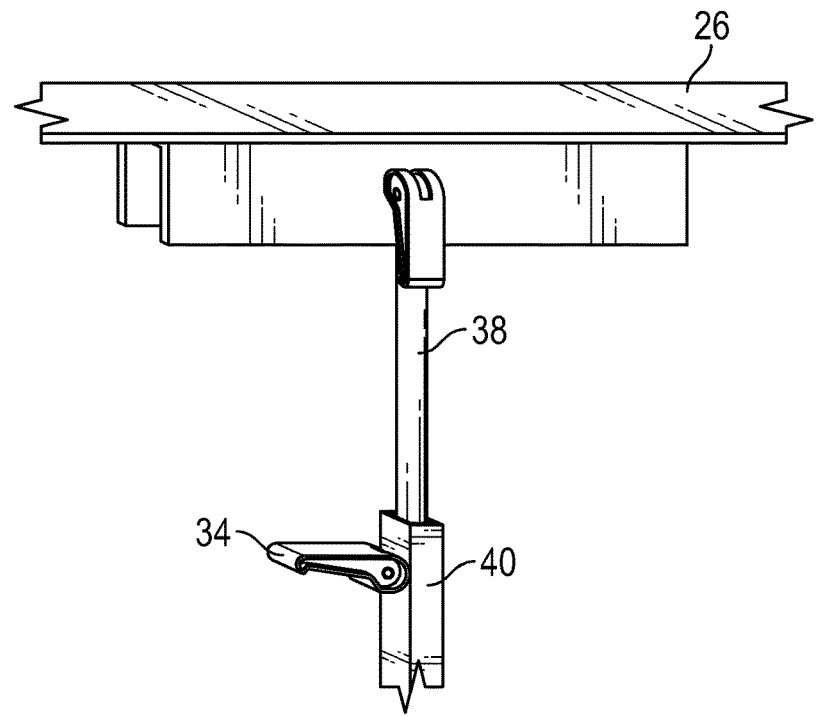
FIG. 4 shows a partial perspective view of a support bracket in accordance with the present disclosure.
Figure 5:
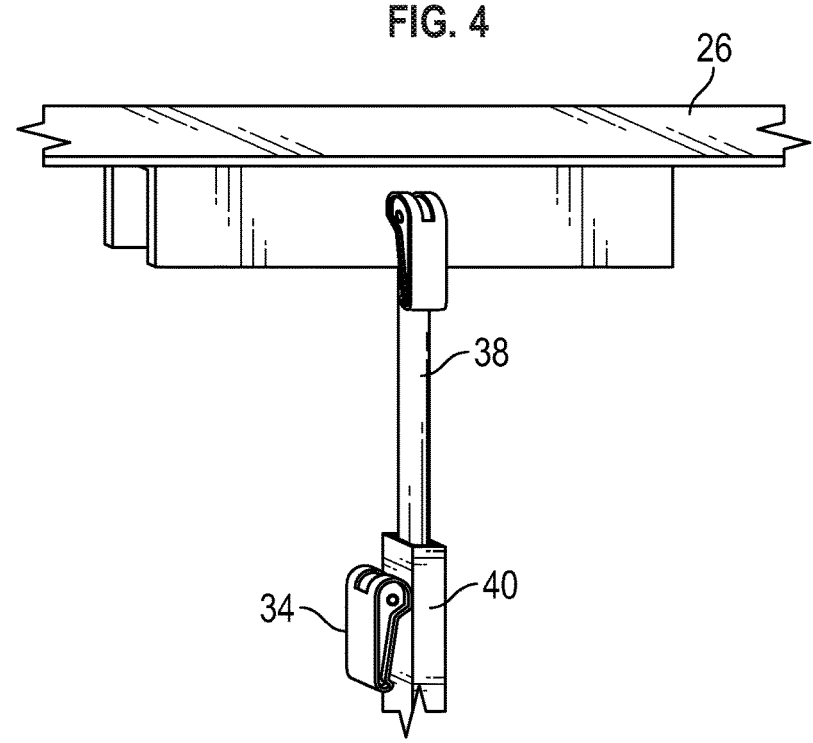
FIG. 5 shows a partial perspective view of a support bracket in accordance with the present disclosure.

As best seen in FIGS. 4 and 5, the support bracket 20 further comprises an arm clamp 34 configured to lock the extension rod 38 in a fixed axial position within the tube 40 such that the extension rod cannot slide into or out of the tube 40. Thus, when the arm clamp 34 is in an open configuration, as shown in FIG. 4, the extension rod 38 can be moved freely into or out of the tube 40 in order to adjust the length of the support arm 24, which accordingly adjusts the height of the support platform 26. When the height of the support platform 26 is adjusted as desired, the arm clamp 34 may be moved to a closed configuration, as shown in FIG. 5. When in a closed configuration, the extension rod 38 is locked in place and cannot move into or out of the tube 40.

Figure 10:
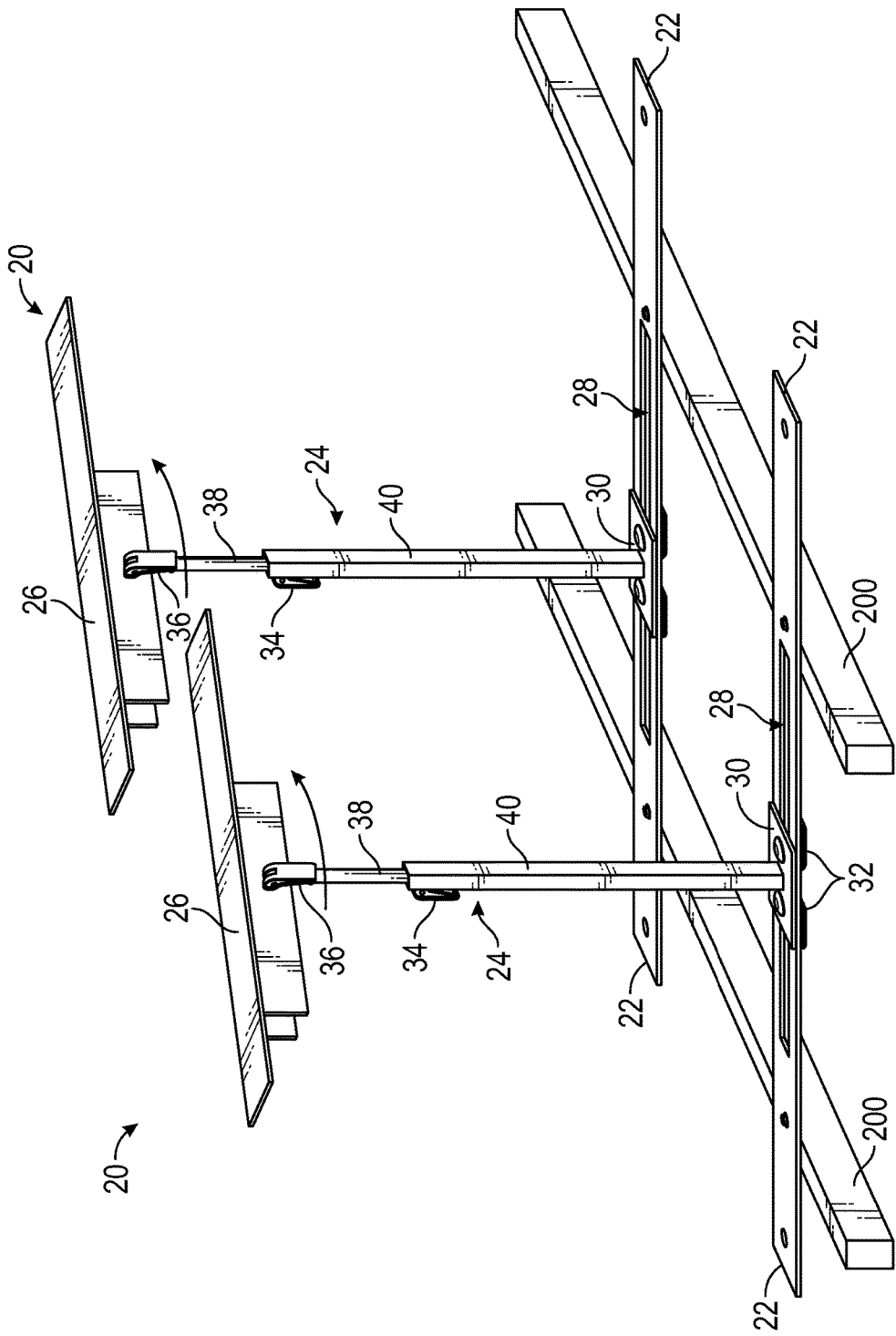
FIG. 10 shows a perspective view of two support brackets installed on a pair of joists in accordance with the present disclosure.

The support platform 26 preferably has an elongated shape and has an upper surface on which conduit 100 may be supported, as best seen in FIG. 3. In a preferred embodiment, the support platform 26 is configured to rotate horizontally. Thus, the elongated support platform 26 may be set in a position generally parallel to the elongated base 22 or may be rotated so that the support platform 26 and base 22 are at any desired angle. FIG. 10 illustrates two support brackets 20 with each respective support platform 26 horizontally rotated in a counterclockwise direction (from a top view perspective), as indicated by the arrows in FIG. 10. The support platform 26 may be rotated horizontally by rotating the extension rod 38 within the tube 40. When the arm clamp 34 is in a closed configuration, the arm clamp 34 locks the extension rod 38 in a fixed rotational position such that the extension rod 38 cannot be rotated within the tube 40, as well as locking the extension rod 38 in a fixed axial position within the tube 40. The horizontal rotation of the support platform 26 allows the brackets 20 to be used to support an air duct 100 running parallel to ceiling joists 200, as shown in FIG. 1, or running at any angle to the joists, such as a 45-degree or a 90-degree angle.

Figure 6:
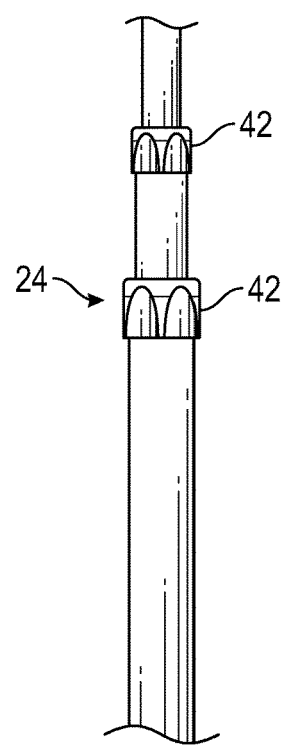
FIG. 6 shows a partial perspective view of a support bracket in accordance with the present disclosure.

In an alternative embodiment, as shown in FIG. 6, the support arm 24 is a telescoping arm comprising segments of varying diameter. In this embodiment, the telescoping support arm 24 may have one or more rotating locks 42 configured to lock a segment of the support arm 24 in a fixed axial position relative to an adjacent segment by turning a rotating lock 42 in a defined direction. Turning the rotating lock 42 in the opposite direction releases the corresponding segment such that the length of the support rod 24 may be adjusted to a desired length. A telescoping support arm with multiple segments may be advantageous in application in which an air duct needs to be supported at a height of four feet or higher.

Figure 11:
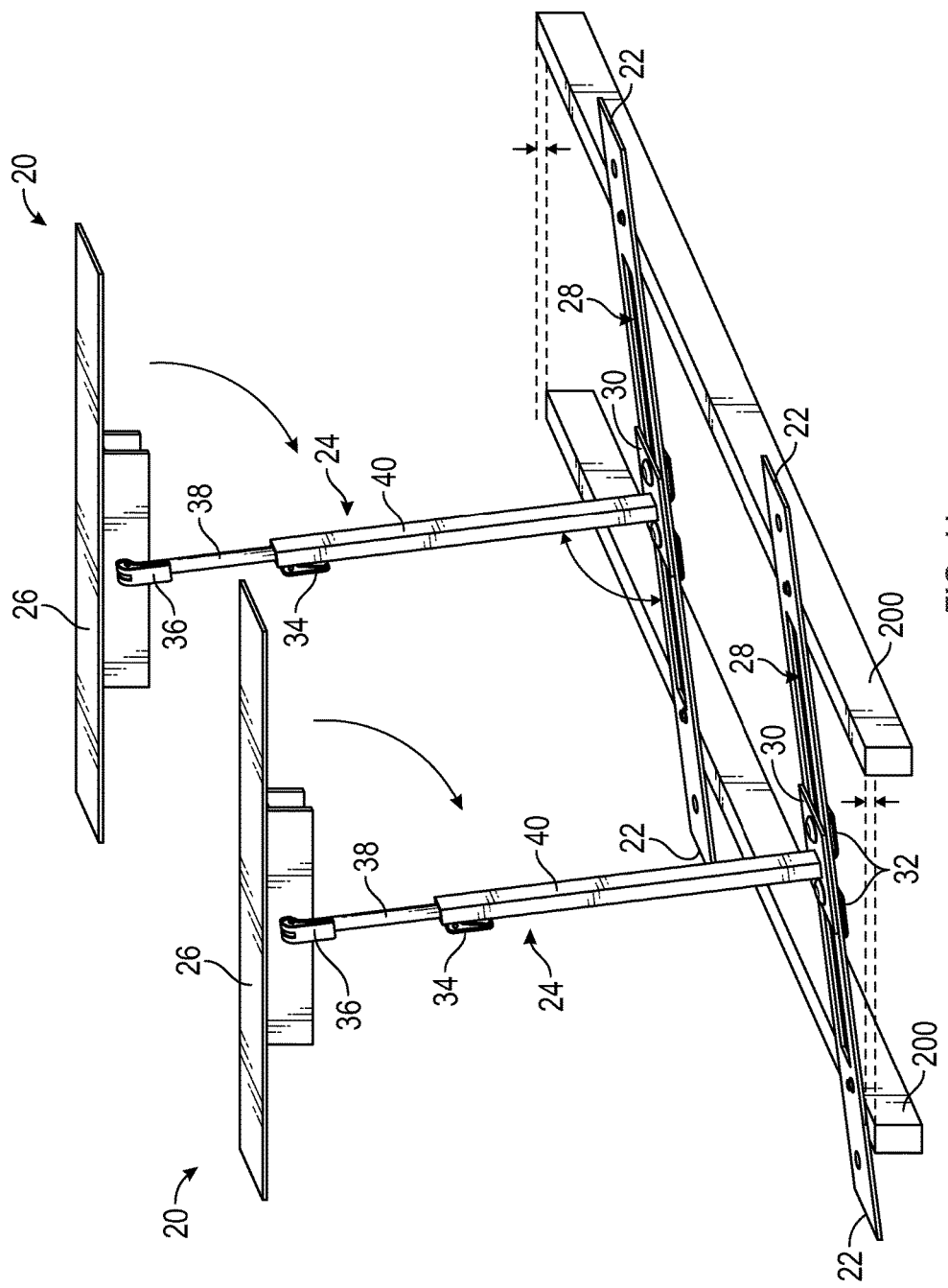
FIG. 11 shows a perspective view of two support brackets installed on a pair of joists in accordance with the present disclosure.

In a preferred embodiment, the support platform 26 is further configured to rotate vertically. Thus, the support platform 26 may be rotated such that an upper surface of the support platform 26 remains in the horizontal plane, as shown in FIG. 3, to ensure a level surface for supporting conduit 100. In some applications, such as shown in FIG. 11, adjacent joists 200 may not be at exactly the same level or height, as indicated by the dashed lines in FIG. 11. In such cases, the upper surface of the support platform 26 may be leveled by rotating the support platform 26 in a vertical direction. FIG. 11 illustrates two support brackets 20 with each respective support platform 26 vertically rotated in a clockwise direction (looking left to right), as indicated by the arrows in FIG. 11. In this embodiment, the connection between the extension rod 38 and the support platform 26 is hinged to allow vertical rotation of the support platform 26. In this embodiment, the support bracket 20 further comprises a platform clamp 36 configured to lock the support platform 26 in a fixed vertical rotational position such that the support platform 26 cannot rotate about its hinged connection to the extension rod 38. The platform clamp 36 functions similarly to the arm clamp 34 described previously. When the platform clamp 36 is in an open configuration, the support platform 26 may be rotated freely in a vertical direction. When the platform clamp 36 is in a closed configuration, the support platform 26 is locked in a fixed position with respect to vertical rotation, though the support platform 26 may still be rotated horizontally and the length of the support arm 24 may still be adjusted utilizing the arm clamp 34.

Figure 9:
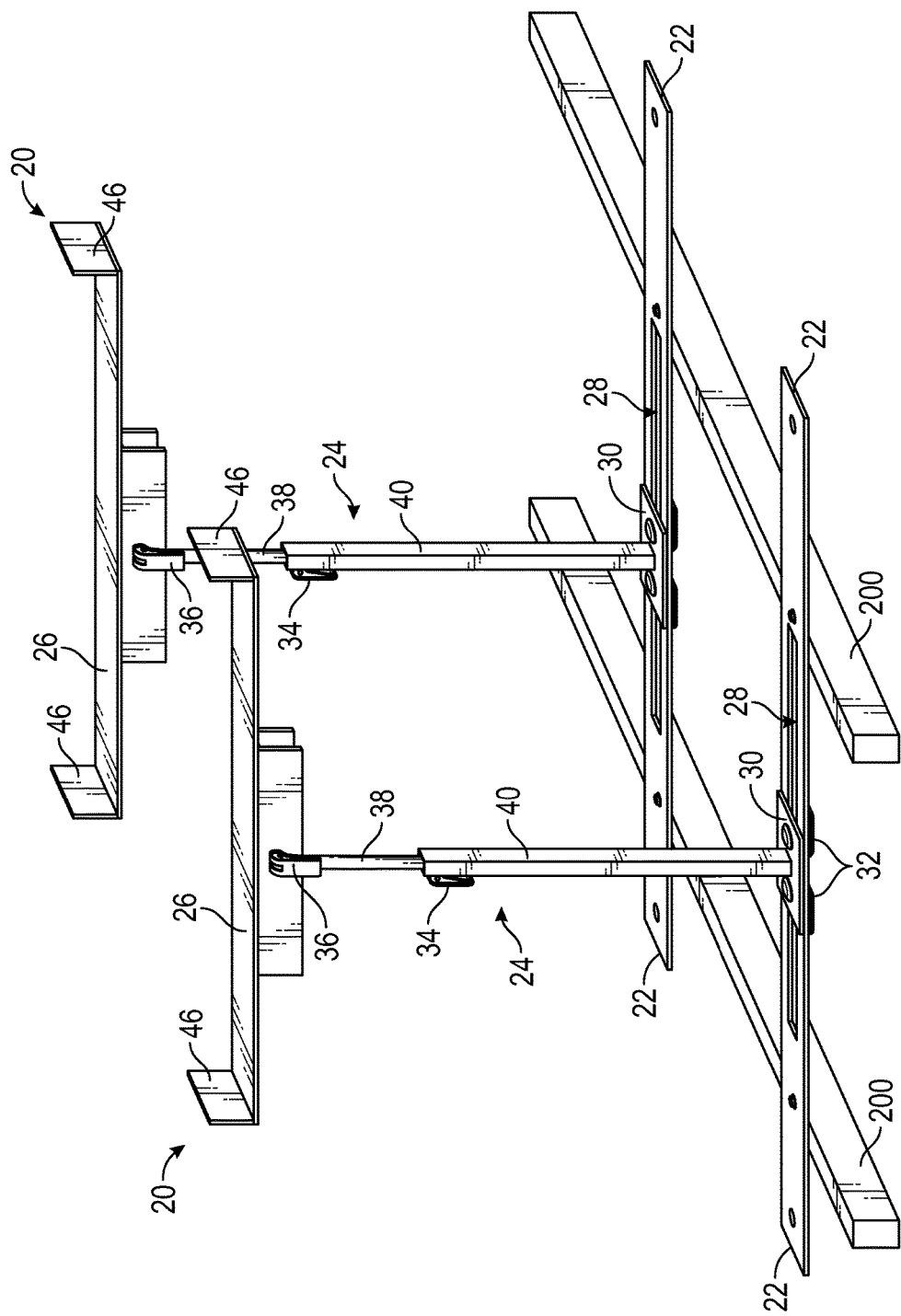
FIG. 9 shows a perspective view of two support brackets installed on a pair of joists in accordance with the present disclosure.

In a preferred embodiment, the support platform 26 is elongated and has two ends each having an upwardly extending edge 46, as shown in FIG. 9. The edges 46 at each end of the support platform 26 prevent a conduit such as an air duct 100 from potentially sliding off of the support platform 26. As shown in FIGS. 1 and 2, when installing a length of conduit 100, the conduit is positioned such that it lays on the support platform 26 in a direction generally perpendicular to the elongated support platform 26.

Figure 7:
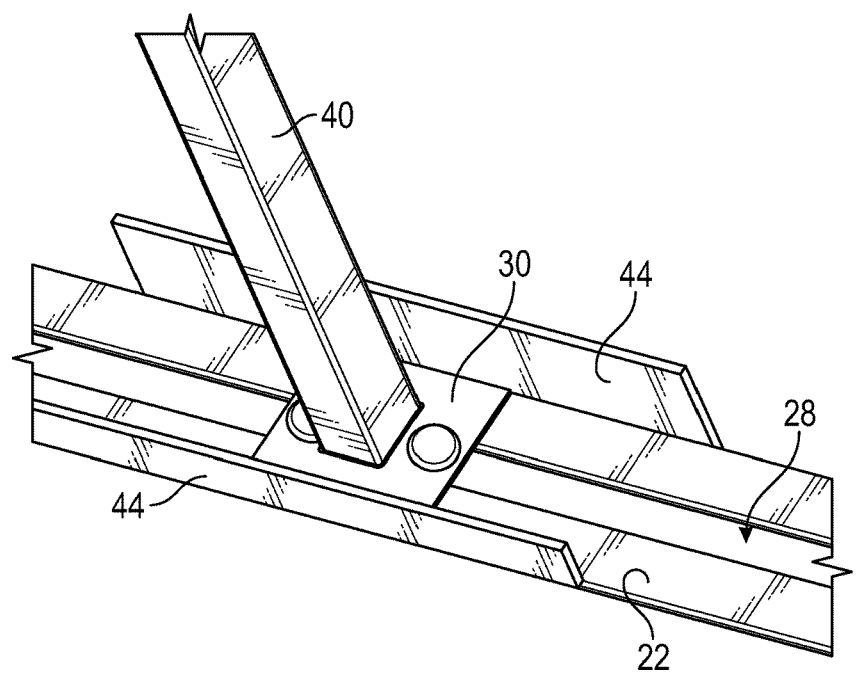
FIG. 7 shows a partial perspective view of a support bracket in accordance with the present disclosure.
Figure 8:
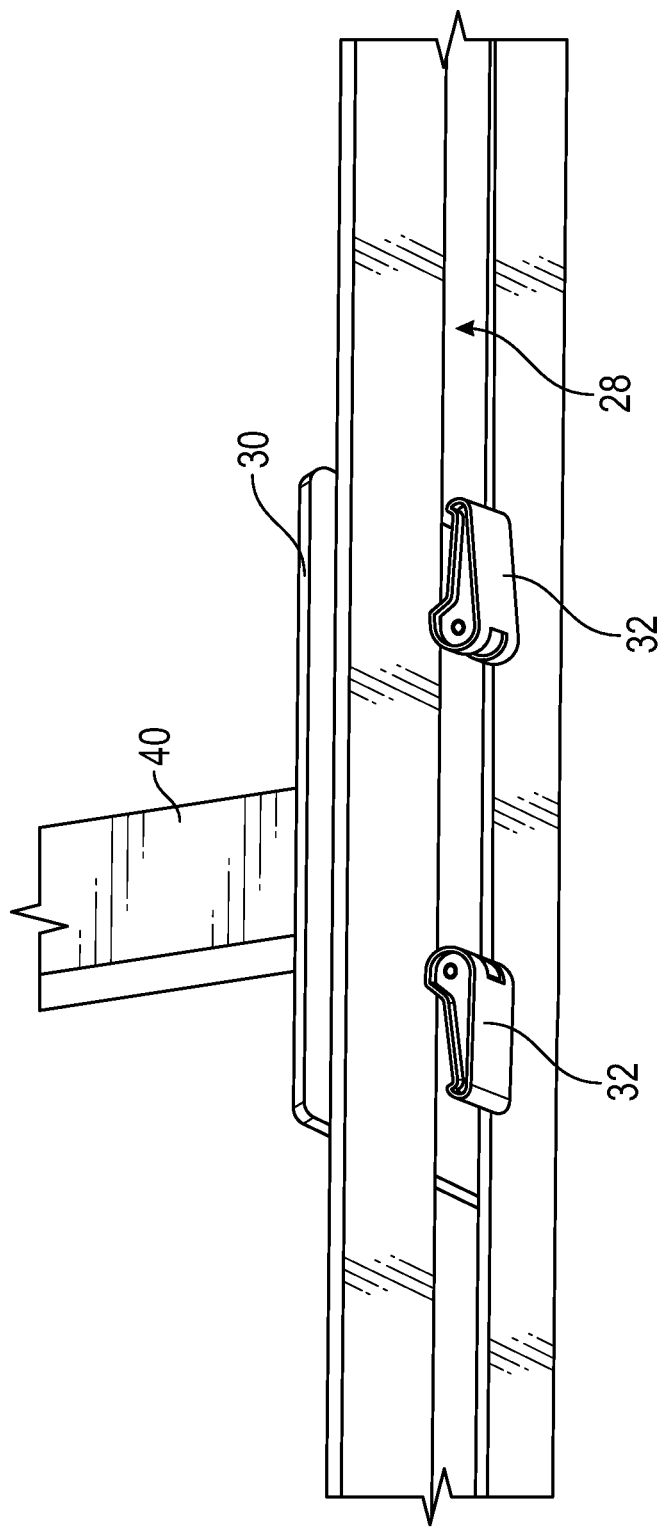
FIG. 8 shows a partial perspective view of a support bracket in accordance with the present disclosure.

In a preferred embodiment, as best seen in FIGS. 3 and 8, the elongated base 22 has a longitudinally configured slot 28 therethrough. In this embodiment, the lateral position of the support arm 24 is adjustable by laterally sliding the end of the support arm 24 secured to the base 22 along the length of the slot 28 in a desired direction. In a preferred embodiment, as best seen in FIGS. 3 and 7, the tube 40 is secured to the base 22 via a base plate 30 having fasteners extending through the slot 28. Thus, the tube 40, along with the base plate 30, may slide laterally within the length of the slot 28. The fasteners prevent the tube 40 from detaching from the base 22 but are not tightened in a manner that would prevent the tube 40 from sliding laterally within the slot 28. In this embodiment, the support bracket 20 comprises at least one, and preferably two, base clamps 32 configured to lock the support arm 24 in a fixed lateral position on the base 22, as best seen in FIG. 8, such that the support arm 24 cannot slide laterally. When the base clamps 32 are in an open configuration, the support arm 24 may slide freely along the length of the slot 28 in order to adjust the lateral position of the support arm. When the base clamps 32 are in a closed configuration, the lateral position of the support arm 24 on the base 22 is fixed. Lateral adjustment of the support arm 24, and thus the support platform 26, provides added flexibility in the positioning of an air duct 100 to be supported by the support brackets 20.

The base clamps 32, arm clamp 34, and platform clamp 36, are each preferably a manually operated toggle clamp having a clamping surface (not shown) that applies inward pressure on the base 22, on the extension rod 38, and on a plate attached to the support platform 26, respectively, when in a closed configuration. However, it should be understood that any type of locking clamp suitable for locking each respective component of the support bracket in a fixed position may be utilized.

As shown in FIG. 7, the base 22 may optionally have side braces 44 to provide additional support for the base plate 30 as the base plate slides along the length of the slot 28.

To use the present conduit support bracket system, a plurality of support brackets 20 are secured to joists 200 in a spaced manner to provide a series of support platforms 26 that provide support for a continuous length of conduit in an elevated position above the joists. For ease of illustration, FIGS. 1 and 2 show only a short length of an air duct 100 supported by two brackets 20 secured to adjacent joists 200. The support brackets may be secured to the joists in any suitable manner, but are preferably screwed or bolted to the joists. One each of the support brackets 20 are secured to the joists in a desire location, the orientation and positioning of each support platform 26 may be adjusted by rotating the support platform 26 vertically and/or horizontally, by adjusting the height of the support platform 26, and/or by adjusting the lateral positioning of the support platform 26 relative to the base 22. The length of the support arm 24 of each of the support brackets 20 may be adjusted such that each of the support platforms 26 is at approximately the same level in order to provide a level horizontal plane of support for the conduit. Once the positioning and the orientation of each support platform 26 is set as desired, the conduit may be positioned on the upper surface of the support platform 26 of each of the support brackets 20 such that the length of the conduit is supported by the plurality of support brackets 20. After adjustments are made to each of the brackets 20, the conduit preferably rests on the upper surface of each support platform 26 in a position generally perpendicular to each support platform 26. Each of the support platforms 26 preferably has an upwardly extending edge 46, as shown in FIG. 9. In this case, the conduit 100 is positioned between the edges 46 to prevent the conduit from sliding off of any of the support platforms 26.

In an alternative embodiment, the length of the support platform 26 may be adjustable to support air ducts 100 of varying widths. For instance, in the embodiment shown in FIG. 9, the length of the support platform 26 may be adjusted so that each of the upwardly extending edges 46 fits flush against the sides of a generally rectangular air duct 100.

As previously stated, both the support platform 26 and the base 22 are preferably elongated in shape. As used herein, elongated indicates a length to width ratio of at least 3 to 1. Utilizing an elongated base 22 and support platform 26 reduces the weight and bulkiness of each of the support brackets 20, thereby making it easier to use and install brackets in small, enclosed working spaces. In addition, utilizing a single base 22 structure that spans between joists 200 with a single support arm 24 connecting the base 22 to the support platform 26 also reduces bulkiness and generally simplifies the design. The support bracket 20 may be constructed of any suitable material, such as metal or a hard plastic material, which may reduce weight. Different components of the bracket may be constructed of different materials.

The support brackets of the present bracket support system allow quick and easy installation of conduit during construction without the need for ad hoc construction of supporting structures for elevating conduit above ceiling joists. Because the height, the orientation, and the lateral positioning of the support platform of each support bracket may be adjusted, the present system provides versatility in installing conduit in any desired configuration during the construction of any residential or commercial structure.

The methods shown and described above are exemplary. Though certain characteristics of the present inventions are described above, the description is illustrative only. It is understood that versions of the invention may come in different forms and embodiments. Additionally, it is understood that one of skill in the art would appreciate these various forms and embodiments as falling within the scope of the invention as disclosed herein.

What is claimed is:

1. A support bracket comprising:
    an elongated base configured to secure the base to a pair of generally parallel joists having a space therebetween;
    a support arm comprising an extension rod and a tube, wherein the extension rod is slidably and rotatably disposed within the tube, the support arm having a first end and a second end, wherein the first end is secured to the base such that the support arm extends upwardly from the base in a direction generally perpendicular to the base, and wherein the length of the support arm is adjustable;
    an elongated support platform secured to the second end of the support arm, wherein the support platform is horizontally rotatable between a first position, a second position, and a third position by rotating the extension arm within the tube, the first position being defined by the support platform extending generally parallel to the base, the third position being defined by the support platform extending generally perpendicular to the base, and the second position being defined by the support platform extending between the first position and the third position; and
    an arm clamp configured to lock the extension rod in a fixed position within the tube to secure the support platform in the first position, the second position, or the third position.

2. The support bracket of claim 1, wherein the support platform is configured to rotate vertically, and wherein the support bracket further comprises a platform clamp configured to lock the support platform in a fixed vertical rotational position.

3. The support bracket of claim 1, wherein the support arm is a telescoping arm.

4. The support bracket of claim 1, wherein the base has a longitudinally configured slot therethrough, wherein the first end of the support arm is slidably secured to the base such that the lateral position of the support arm is adjustable by laterally sliding the first end of the support arm along the length of the slot.

5. The support bracket of claim 1, wherein the support platform has two ends, wherein each end has an upwardly extending edge.

6. A support bracket comprising:
    an elongated base configured to secure the base to a pair of generally parallel joists having a space therebetween, wherein a longitudinal slot extends through the base between a first closed end and a second closed end of the base;
    a support arm comprising an extension rod slidably and rotatably disposed within a tube such that the support arm is extendable and collapsible by sliding the extension rod into or out of the tube, wherein the tube is slidably secured to the base and extends upwardly from the base in a direction generally perpendicular to the base;
    an elongated support platform secured to the extension rod, wherein the support platform is horizontally rotatable between a first position, a second position, and a third position by rotating the extension rod within the tube, the first position being defined by the support platform extending generally parallel to the base, the third position being defined by the support platform extending generally perpendicular to the base, and the second position being defined by the support platform extending between the first position and the third position, and wherein the support platform is configured to rotate vertically;
    an arm clamp configured to lock the extension rod in a fixed position within the tube to secure the support platform in the first position, the second position, or the third position; and
    a platform clamp configured to lock the support platform in a fixed vertical rotational position.

7. The support bracket of claim 6 further comprising a base clamp configured to lock the support arm in a fixed position on the base.

8. The support bracket of claim 6, wherein the support platform has a first end and a second end, wherein each end of the support platform has an upwardly extending edge such that the upwardly extending edge of the first end is parallel to the upwardly extending edge of the second end.

9. A method of supporting a conduit, said method comprising the steps of:
    providing a plurality of support brackets, wherein each support bracket comprises:
        an elongated base configured to secure the base to a pair of generally parallel joists having a space therebetween;
        a support arm comprising an extension rod and a tube, wherein the extension rod is slidably and rotatably disposed within the tube, the support arm having a first end and a second end, wherein the first end is secured to the base such that the support arm extends upwardly from the base in a direction generally perpendicular to the base, and wherein the length of the support arm is adjustable;
        an elongated support platform secured to the second end of the support arm, wherein the support platform is horizontally rotatable between a first position, a second position, and a third position by rotating the extension rod within the tube, the first position being defined by the support platform extending generally parallel to the base, the third position being defined by the support platform extending generally perpendicular to the base, and the second position being defined by the support platform extending between the first position and the third position; and
        an arm clamp configured to lock the extension rod in a fixed position within the tube to secure the support platform in the first position, the second position, or the third position;
    securing each of the plurality of support brackets to a pair of joists; and
    positioning a conduit on the support platform of each of the plurality of support brackets such that the conduit is supported by the plurality of support brackets.

10. The method of claim 9, further comprising the step of adjusting the length of the support arm of each of the plurality of support brackets such that each support platform of the plurality of support brackets secured to a pair of joists is at approximately the same level.

11. The method of claim 9, wherein each support platform has two ends, wherein each end has an upwardly extending edge, wherein the step of positioning a conduit on the support platform of each of the plurality of support brackets comprises positioning the conduit between the two ends of each support platform.

12. The support bracket of claim 4, wherein the base has a closed first end and a closed second end, wherein the slot is disposed between the first closed end and the second closed end of the base.

13. The support bracket of claim 12, wherein the slot has a first end and a second end, and wherein the base has at least one hole therein disposed between the first closed end of the base and the first end of the slot and at least on hole therein disposed between the second closed end of the base and the second end of the slot.

14. The support bracket of claim 13, wherein a first hole within the at least one hole disposed between the first closed end of the base and the first end of the slot is spaced a distance apart from a second hole within the at least one hole disposed between the second closed end of the base and the second end of the slot equal to the space between the joists.

15. The support bracket of claim 13, wherein the at least one hole disposed between the first closed end of the base and the first end of the slot comprises two holes and the at least one hole disposed between the second closed end of the base and the second end of the slot comprises two holes.

16. The support bracket of claim 4, wherein the support arm is secured to a base plate having a fastener extending through the slot.

17. The support bracket of claim 16, wherein the fastener is configured to secure the base plate in a fixed position on the base when placed in a closed configuration.

18. The support bracket of claim 6, wherein the base has a first hole, a second hole, a third hole, and a fourth hole therein, wherein the first hole and the second hole are each disposed between the first closed end of the base and a first end of the slot, and wherein the third hole and the fourth hole are each disposed between the second closed end of the base and a second end of the slot.

19. The support bracket of claim 18, wherein the first hole and the third hole are spaced 16 inches apart, and wherein the second hole and the fourth hole are spaced 24 inches apart.

20. The support bracket of claim 6, wherein the tube is secured to a base plate having a fastener extending through the slot, wherein the fastener is configured to secure the base plate in a fixed position on the base when placed in a closed configuration.

* * * * *